(12) United States Patent
Wittmann

(10) Patent No.: US 11,267,371 B2
(45) Date of Patent: Mar. 8, 2022

(54) VEHICLE SEAT HAVING A ROLLER GUIDE

(71) Applicant: GRAMMER AG, Amberg (DE)

(72) Inventor: Hubert Wittmann, Amberg (DE)

(73) Assignee: GRAMMER AG, Ursensollen (DE)

( * ) Notice: Subject to any disclaimer, the term of this patent is extended or adjusted under 35 U.S.C. 154(b) by 28 days.

(21) Appl. No.: 16/903,687

(22) Filed: Jun. 17, 2020

(65) Prior Publication Data

US 2020/0398708 A1 Dec. 24, 2020

(30) Foreign Application Priority Data

Jun. 21, 2019 (DE) .......................... 102019116787.6

(51) Int. Cl.
*B60N 2/07* (2006.01)
*B60N 2/02* (2006.01)
*B60N 2/16* (2006.01)

(52) U.S. Cl.
CPC ........ *B60N 2/1635* (2013.01); *B60N 2205/20* (2013.01)

(58) Field of Classification Search
CPC ..... B60C 11/24; B60C 11/243; B60C 11/246; G01N 27/041; G01N 2033/0085; G01M 17/02; G01M 17/022; G01M 17/045; G01M 17/065
USPC .................................................... 297/344.15
See application file for complete search history.

(56) References Cited

U.S. PATENT DOCUMENTS 8,996,239 B2 * 3/2015 Orlewski .............. B60C 11/243
701/32.7
2005/0016649 A1 * 1/2005 Poulbot ................... B60C 19/00
152/154.2
2009/0072842 A1 * 3/2009 Murakami .............. B60C 19/08
324/691
2015/0231992 A1 * 8/2015 Gundall ................... B60N 2/68
297/344.15
2019/0001756 A1 * 1/2019 Gholamzadeh Nasrabadi ............
B60C 11/246

FOREIGN PATENT DOCUMENTS

DE 102016108159 11/2017

OTHER PUBLICATIONS

Official Action for German Patent Application No. 102019116787.6, dated Apr. 27, 2020, 2 pages.

* cited by examiner

*Primary Examiner* — Sarah B McPartlin
(74) *Attorney, Agent, or Firm* — Sheridan Ross P.C.

(57) ABSTRACT

The invention relates to a vehicle seat having a roller guide which has at least one guide rail which is at least partially sideways open and at least one running roller rolling in the guide rail, connected to parts of the vehicle seat via an axle member, wherein a running surface of the running roller is rollable along a roller-underside inner wall of the guide rail arranged parallel or at an angle to a middle axle of the running roller, wherein the running roller comprises at least a first area and a second area, wherein the first area forms at least a part of the running surface and the second area is arranged in a radial direction of the running roller at least partially between the axle member and the first area and in contact with both. According to the invention, an electrical conductivity of the first area is lower than an electrical conductivity of the second area.

15 Claims, 4 Drawing Sheets

VEHICLE SEAT HAVING A ROLLER GUIDE

CROSS-REFERENCE TO RELATED APPLICATIONS

This application claims the benefit of German Patent Application No. 10 2019 116 787.6 filed Jun. 21, 2019, the entire contents of which are incorporated herein by reference in their entirety.

FIELD

The invention relates to a vehicle seat having a roller guide.

BACKGROUND

Roller guides for vehicle seats, in particular for the rolling of running rollers which are connected to a scissor frame which expands forwards and backwards in the forward and backward direction as the vehicle seat swings up and down, and thus requiring rolling of the running rollers within the guide rail, are widely known.

It is also known that running rollers wear out after a certain operating time. In particular, the running surface of the running roller, that is, the area that forms contact with the running rail when rolling in the running rail, is worn down by material abrasion. The consequence being that the outer diameter of the running roller becomes smaller and is therefore no longer aligned with the dimensions of the running rail. This may cause running noises and play; the running roller rolls, so to speak, "unround" within the guide rail. In addition, there is a risk of further damage to the members of the roller guide up to the breakage of the running roller and/or complete failure of the arrangement.

Due to the fact that the running roller rolls within the guide rail and is accordingly inaccessibly built in, there is also the problem that a pure visual inspection is not easily possible without dismantling the roller guide.

SUMMARY

The object of the invention is therefore to provide a vehicle seat having a roller guide which enables a detection of a critical state of wear of the running rollers in a simple manner.

A substantial point of the invention is that in a vehicle seat having a roller guide, which has at least one guide rail which is laterally open at least in part, and at least one running roller rolling in the guide rail connected to parts of the vehicle seat via an axle member, wherein a running surface of the running roller is rollable along a roller-underside inner wall of the guide rail arranged parallel or at an angle to a middle axle of the running roller, wherein the running roller comprises at least a first area and a second area, wherein the first area forms at least a part of the running surface and the second area is arranged in a radial direction of the running roller at least partly between the axle member and the first area and contacting both. According to the invention, an electrical conductivity of the first area is lower than an electrical conductivity of the second area.

It should be noted that a vehicle seat according to the invention has, for example, a scissor frame which has a rear end and a front end in a longitudinal direction of the vehicle seat. At the rear end, the scissor frame is preferably connected to the rest of the vehicle seat at the top and bottom as well as on the left and right, each via a fixed bearing; the arrangement of a rolling running roller is therefore preferably not provided. In contrast, the scissor frame at the front end preferably has one roller guide each as a floating bearing above and below and to the left and right, thus a total of four roller guides, which preferably comprises exactly one running roller rolling in a guide rail arranged in the longitudinal direction of the vehicle seat.

It is also possible that there is no fixed bearing arranged at the top but, for example, further running rollers for a horizontal suspension. In this case, it is preferable that a total of two further running rollers and six running rollers according to the invention are arranged within the scissor frame.

It may be advantageous that all four running rollers are designed just like the running roller according to the invention. For reasons of cost, however, it may be sufficient to design only a part of the running rollers, for example the running rollers which experience the most severe abrasion, like the running roller according to the invention, in order to use them as an indicator. For example, the two bottom running rollers are designed in the same way as the running roller according to the invention. For example, the two upper running rollers are not designed in the same way as the running roller according to the invention.

By using the vehicle seat and the associated rolling of the running roller within the guide rail, the running roller will be gradually worn out as described above. This can be demonstrated, for example, by the fact that the first area is subject to material abrasion which, after a certain period of utilisation, exposes the second area which is adjacent (inside) in the radial direction of the running roller. An electrical resistance formed by the running surface of the running roller is therefore high when the running roller is in its default state, that is, its undamaged state, and lower when the running roller is in a first state of wear, according to which the second area is exposed and forms at least a part of the running surface.

Preferably the second area does not form any section of the running surface in the default state of the running roller, in such a manner that the second area in particular is arranged without contact with the guide rail in the default state of the running roller.

Since in particular the axle member, the running roller and the guide rail are arranged contacting each other, it is possible to measure the resistance of a current conductive path starting from the guide rail via the running roller up to the axle member. It is therefore advantageous if a measuring apparatus is provided for measuring an electrical resistance between the axle member and the guide rail.

It is assumed that the axle member and the guide rail have an electrical conductivity which is higher than the electrical conductivity of the first area. Preferably, the electrical conductivity of the axle member as well as the guide rail are each at least equal to or greater than the electrical conductivity of the second area. The electrical resistance of the first area is therefore preferably the highest of all electrical resistances mentioned. This can ensure that an electrically conductive path is formed between the axle member and the guide rail over the first area, if still present, and the second area. At the same time, it can be excluded that the actually desired detection of abrasion of the running roller is prevented by the electrically insulating properties of the axle member and/or of the guide rail.

It is assumed here as the basis for the measurement that a series circuit of resistances is arranged between the axle member and the guide rail, wherein a first resistance is assigned to the axle member, a second resistance to the second area, a third resistance to the first area and a fourth resistance to the guide rail. Either the values are known in advance in such a manner that a theoretical total resistance can be calculated as the sum of the first to fourth resistances.

Alternatively, an actual value of the total resistance can be measured in the default state of the running roller. This total resistance in the default state of the running roller is referred to as the first total resistance, for example, and can serve as the first reference value for the resistance measurement.

If the running roller is now in a first state of wear, it is assumed that the theoretical total resistance can only be calculated as the sum of the first resistance, the second resistance and the fourth resistance, which is logically smaller than the first total resistance. This total resistance theoretically present in the first state of wear is referred to as the second total resistance and can of course also be measured as the actual value by means of the measuring apparatus by installing a running roller at least for the reference measurement, which is already present in the first state of wear. This second total resistance can serve as a second reference value for the resistance measurement.

If it is now determined by means of the resistance measurement by the measuring apparatus that the actual total resistance is equal to the first total resistance, it is assumed that the running roller is in its default state; a replacement of the running roller is therefore not yet necessary. In this case, preferably no message is sent to a superior control apparatus.

If, on the other hand, it is determined by means of resistance measurement by the measuring apparatus that the actual total resistance is smaller than the first total resistance and/or equal to the second total resistance, it is assumed that the running roller is in the first state of wear; a replacement of the running roller is therefore necessary or at least recommended. In this case, a message is preferably sent to the superior control apparatus, which in turn transmits a signal, for example, to an optical and/or acoustic indicating apparatus, which notifies the driver of the necessary replacement of the running roller by a corresponding image and/or sound message. For example, a resistance measurement is possible separately for each running roller designed according to the invention of the scissor frame, in such a manner that it is detectable which of the running rollers designed according to the invention are in the first state of wear.

In order to meet the practical requirements, it is appropriate to consider measurement tolerances when comparing the actual total resistance with the given values. It is therefore preferable that the aforementioned comparisons provide correct results even when the actual total resistance for example has a value that lies within an area of 0.95 to 1.05 times the value of the first or second total resistance.

For example, the measuring apparatus is permanently arranged in such a manner that the electrical resistance can be measured continuously. Alternatively, the measuring apparatus is only temporarily arranged in such a manner that the electrical resistance can be measured once, for example after a predetermined maintenance interval.

It is also appropriate to perform a measurement with a rotating running roller. This way it is considered that in the circumferential direction of the running roller possibly first compartments, where the first area is already worn out, as well as second compartments, where the first area is still completely or at least still in a reduced layer thickness, are arranged. In this case, the resistance would have a temporal progression which is at least equally designated for a determined time interval. For example, the resistance drops abruptly during a single rotation of the running roller and then rises again, corresponding to the contacting of the first or second compartments with the running rail. This change in the resistance is also detectable, since here too a determined threshold value would also be exceeded at regular distances.

Preferably, a detection of the state of the running roller by means of the present invention is therefore possible, which can be performed in particular non-destructively and in particular without dismounting the roller guide.

According to a preferred embodiment, it is sufficient if the second area is not continuously arranged in the axial direction and/or in the circumferential direction of the running roller. It is conceivable that the second area has different shapes. It is preferred that the second area is in the shape of at least a sleeve, at least a pin and/or at least a plate. All these shapes are standard shapes, which can, for example, be provided in the shape of a standard component.

A sleeve is understood to be a shape which is hollow-cylindrical or is structured substantially hollow-cylindrical, hence has two end surfaces, a lateral surface with an outer diameter and a cylindrical recess with an inner diameter. The cylindrical recess can be continuously arranged or only extend over a section of the thickness of the sleeve, wherein the thickness corresponds to the distance between the two end surfaces.

A pin is understood to be a shape which is cylindrical or is structured substantially cylindrical, hence has two end surfaces, a lateral surface and an outer diameter.

A plate is understood to be a shape which is hollow-cylindrical or is constructed substantially hollow-cylindrical, hence has two end surfaces, a lateral surface with an outer diameter and a cylindrical recess with an inner diameter. The cylindrical recess is typically continuously arranged over the entire thickness of the sleeve, wherein the thickness corresponds to the distance between the two end surfaces. Contrary to the sleeve, here the ratio of the thickness of the plate is small in relation to the outer diameter of the plate.

In the present case, the running roller has a first and a second end in relation to its axial direction. It is preferred that the second area forms at least partially at least one of the first and second ends of the running roller.

For example, the second area may comprise at least a metal pin which is connected to the axle member. For example, a lower end of the metal pin may have an outer thread which forms a screw connection with an internally threaded hole in the axle member. For example, a middle axle of the metal pin is parallel to the radial direction of the running roller.

This metal pin can completely form the second area. However, it is preferred that the metal pin is arranged as the second section of the second area, while a first section of the second area is arranged surrounding the metal pin, in such a manner that the second area as a whole is formed, for example, in the shape of a sleeve.

It is also conceivable that the second area comprises at least one washer. For example, an inner diameter of a through-hole of this washer is arranged in contact with an outer diameter of the axle member. For example, a middle axle of the washer is aligned with a middle axle of the axle member.

It is also conceivable that the second area has at least one spacer sleeve. For example, an inner diameter of a through-hole of this spacer sleeve is arranged in contact with an outer diameter of the axle member. For example, a middle axle of the spacer sleeve is aligned with the middle axle of the axle member.

Further, combinations of the aforementioned examples are conceivable. It is thus conceivable that the second area is designed in the shape of a plurality of, preferably two, plates. Thus one of these plates could be arranged at each one axial end area of the running roller.

Furthermore, it may be that, at least at one axial position of the running roller, a ratio between a first volume section of the first area and a second volume section of the second area is designated to decrease continuously or stepwise in the radial direction towards the middle axle.

It is further preferred that by means of the geometric design of the second area, an abrasion behaviour of the first area varying in at least one dimension (radial, axial or circumferential) is detectable over at least a portion of the respective dimension and/or not only punctual. For example, if it is determined that the abrasion of the running roller in the axial direction is not the same at every position, the aforementioned combination of the two plates at both axial ends of the running roller could satisfy this difference.

It is further conceivable that the first area is arranged completely without contact to the axle member; this applies preferably to the initial state and the first (and second) wear state. For example, the first area is only arranged in the shape of a coating on the second area. An exemplary thickness of the first area is in an area of 0.3 to 1.0 mm, preferably at 0.5 mm.

It is further preferred that the first area completely forms the running surface in the default state of the running roller.

It is also conceivable that the second area is arranged extending over the entire extent of the running roller in its axial direction.

Preferably, the material of the first area is shaped through injection moulding onto the material of the second area. Through this production engineering measure, the running roller can be manufactured in a single injection mould shape in a simple manner.

Depending on the selection of materials, the running roller can be manufactured in a two-component injection mould, if the second area also consists of a plastic material. Alternatively, the second area is structured by means of an insertion part or comprises at least one insertion part which is inserted into the shape prior to the injection moulding process and which is overmoulded by the first area and/or by a further section of the second area. It is also possible that, in order to improve the electrical conductivity of the second area, electrically conductive inserts, such as at least one metal sheet, at least one metal plate or at least one metal filament are embedded in the electrically conductive material of the second area.

Thus it is preferred that the first area is made of a first plastic and the second area is made of a second plastic and/or a metallic material.

Preferably, a filled plastic, for example a plastic filled with graphite or aluminium powder, is chosen as the electrically conductive material of the second area. The material of the first area is preferably polyoxymethylene (POM).

In order to manufacture a running roller whose abrasion behaviour is even more accurately detectable, it is further conceivable that the second area of the running roller comprises a third area, which is at least partially arranged in the radial direction of the running roller between the axle member and a remainder of the second area and in contact with both, wherein an electrical conductivity of the remainder of the second area is lower than an electrical conductivity of the third area.

Thus, for example, a second state of wear of the running roller can be detected, according to which the third area forms contact with the guide rail, since the first area and the remainder of the second area have already been abraded. It is therefore possible that an initial state of wear of the running roller is first detected without it subsequently being replaced. The running roller then experiences further abrasion until it is in its second state of wear, after which, for example, the request to replace the running roller can be provided again in a more urgent formulation.

Advantageous embodiments can be found in the dependent claims.

BRIEF DESCRIPTION OF THE DRAWINGS

Advantages and expediencies can be found in the following description in connection with the drawings.

In which.

DETAILED DESCRIPTION

Figure 1A:
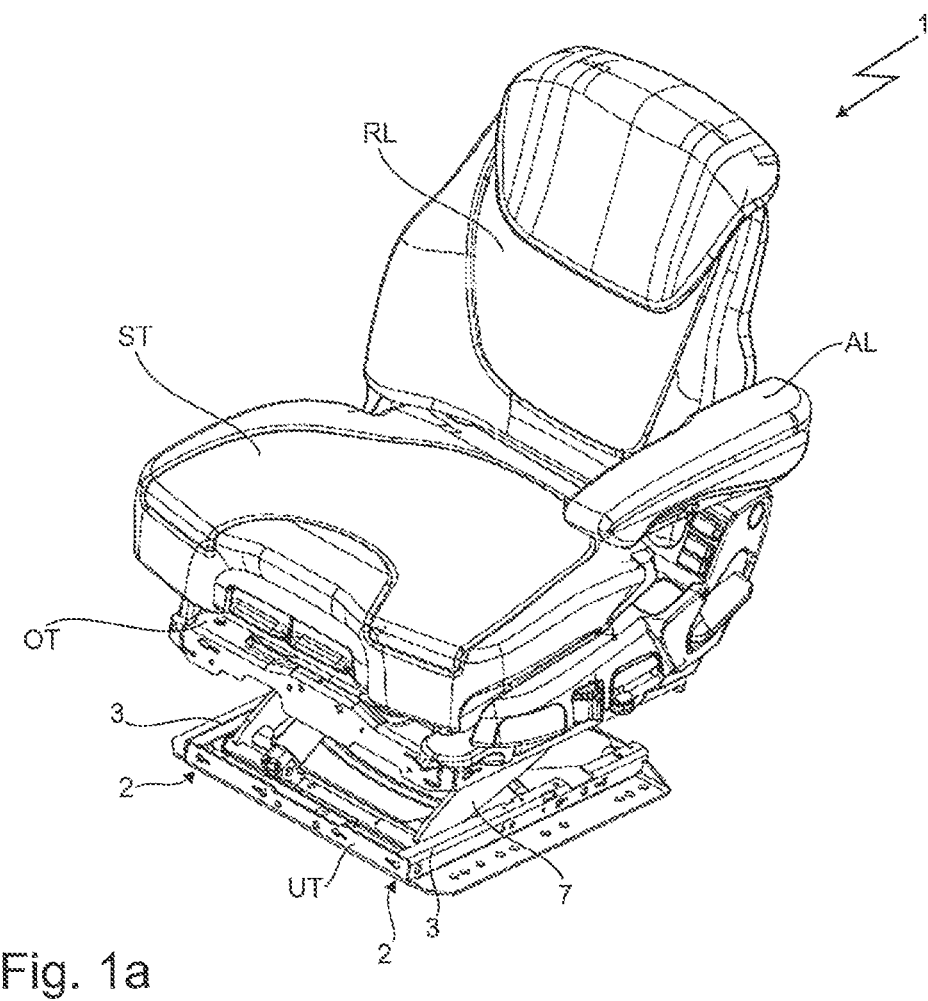
FIG. 1a is a perspective representation of a vehicle seat according to the invention.

FIG. 1a shows a perspective representation of a vehicle seat 1 having a seat part ST, a backrest RL and an armrest AL. A bottom part UT of the vehicle seat 1 is connected to a top part OT by means of a scissor frame 7, in such a manner that the two parts UT, OT can move towards each other. The top part OT is therefore swingingly mounted opposite to the bottom part UT.

Figure 1B:
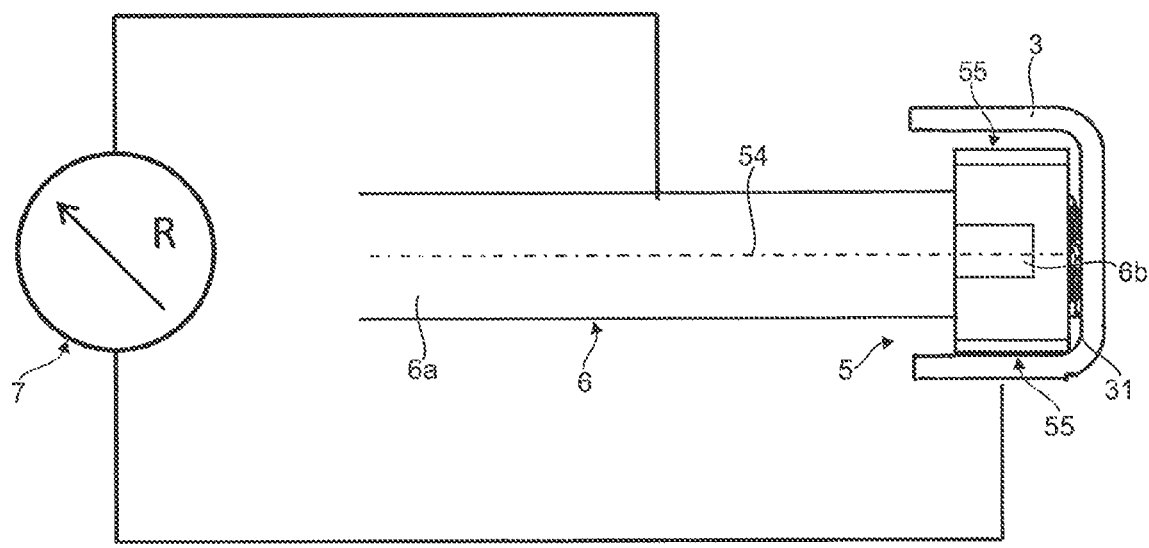
FIG. 1b is a schematic representation of a measuring setup for measuring the resistance of the roller guide.

In order to allow the scissor arms of the scissor frame 7 to swing up and down, said scissor arms must be at least partially movably arranged, even at their bottom ends, in the longitudinal direction of the vehicle, that is, in forward and backward directions. For this purpose, guide rails 3 are provided (see also FIG. 1b), which are preferably C-shaped or U-shaped in their cross-section and within which running rollers 5, in this case a single running roller 5 per roller guide 2, are rollingly mounted.

The running roller 5 is arranged on a respective axle member 6, to which, in turn, parts of the vehicle seat 1, for example not shown dampers or suspension members, are fixed.

The FIGS. 3a to 3d now show different embodiments of the present invention.

It can be seen from the FIG. 1a and 3a to 3d that the vehicle seat 1 having a roller guide 2, which has at least one guide rail 3 which is at least partially sideways open, and at least one running roller 5 rolling in the guide rail 3 and is, connected to parts of the vehicle seat 1 via an axle member 6. A running surface 55 of the running roller 5 is thereby rollable along a roller-underside inner wall 31 of the guide rail 3 arranged parallel to or at an angle to a middle axle 54 of the running roller 5. The running roller 5 comprises respective at least a first area 51 and a second area 52, wherein the first area 51 forms at least a part of the running surface 55 and the second area 52 is arranged at least partially between the axle member 6 and the first area 51 and in contact with both in a radial direction 5r of the running roller 5. In the present case, an electrical conductivity of the first area 51 is lower than an electrical conductivity of the second area 52.

The FIG. 1a, 1b and 3a to 3d each show a default state of the running roller 5.

The axle member 6 has a first 6a and a second portion 6b in the axial direction 6z, which differ regarding their outer diameter. Regarding the used material and especially regarding the electrical conductivity, both portions 6a, 6b are identical or at least similar.

According to all the embodiments, the second area 52 does not form any section of the running surface 55 in the default state of the running roller 5, in such a manner that the second area 52 is arranged without contact to the guide rail 3 in the default state of the running roller 5. Furthermore, the first area 51 completely forms the running surface 55 in the shown default state.

Since the axle member 6, the running roller 5 and the guide rail 3 are arranged contacting each other, it is possible to measure the resistance of a current conductive path starting from the guide rail 3 via the running roller 5 up to the axle member 6. According to FIG. 1b it is shown that a measuring apparatus 7 is provided for measuring an electrical resistance R between the axle member 6 and the guide rail 3.

Thereby, the axle member 6 and the guide rail 3 have an electrical conductivity which is greater than the electrical conductivity of the first area 51 and is also greater than the electrical conductivity of the second area 52. The electrical resistance of the first area 51 is the highest of all electrical resistances mentioned.

In the present case, the measuring apparatus 7 is permanently arranged in such a manner that the electrical resistance can be measured continuously.

A detection of the state of the running roller 5 is therefore possible by means of the present invention, which can be performed in particular non-destructively and in particular without dismounting the roller guide 2.

According to the FIGS. 3a to 3d, the guide rail 3 is merely indicated with the roller-underside inner wall 31.

According to the FIGS. 3a to 3d a left and a right picture are shown. The left picture thereby represents a cross-section through the middle axle 54 of the running roller 5 along a plane which is marked according to the right picture (see for example FIG. 3a, cross-section A2-A2 along plane A2). The right picture, on the other hand, represents a cross section perpendicular to the middle axle 54 of the running roller 5 and running through the second area 52, wherein this cross section runs along a plane which is marked according to the left picture (see, for example, FIG. 3a, cross-section A1-A1 along plane A1).

In order not to jeopardise the clarity, a hatched representation of the cross-section of the axle member 6, 6a, 6b has been omitted.

Figure 3A:
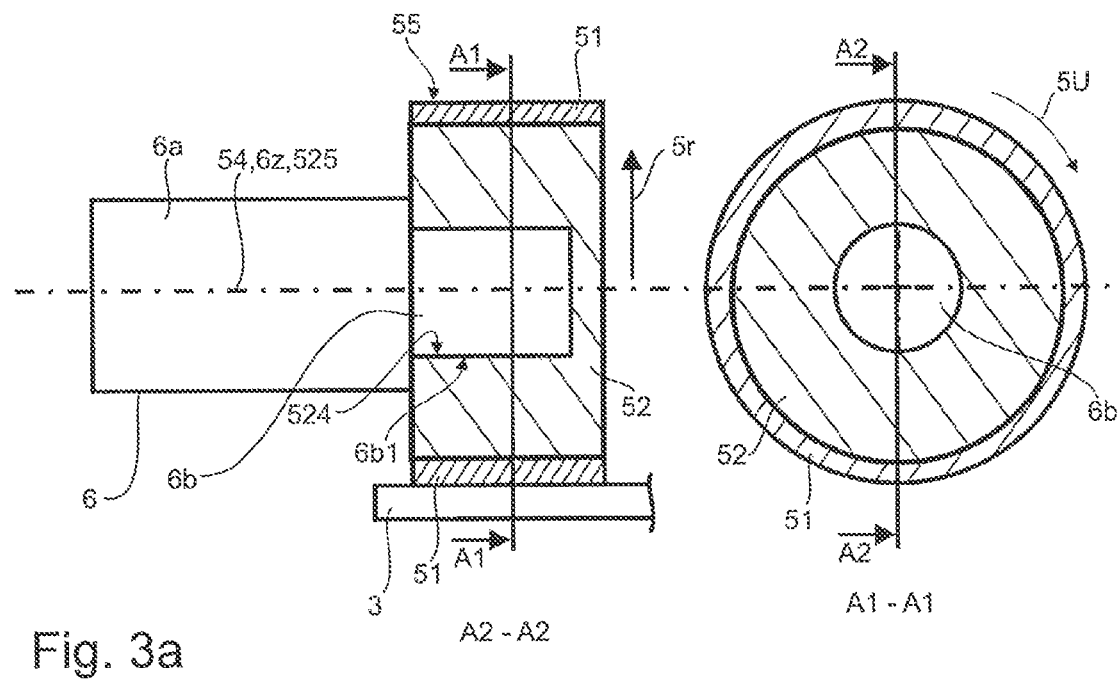
FIG. 3a is a first preferred embodiment of the used running roller.

The FIG. 3a now shows an embodiment of a running roller 5, according to which the second area 52 is arranged throughout in circumferential direction 5U and in axial direction 54 of the running roller 5. In the present case, the second area 52 is designed in the shape of a sleeve. In the present case, an inner diameter 524 of a through-hole of this spacer sleeve is arranged in contact with an outer diameter 6b1 of the axle member 6. A middle axle 525 of the spacer sleeve is aligned with the middle axle 6z of the axle member 6 and with the middle axle 54 of the running roller. According to FIG. 3a, the first area 51 is also completely contactless to the axle member 6, 6a, 6b and is only arranged in the shape of a coating with a layer thickness of 0.5 mm on the second area 52.

Figure 3B:
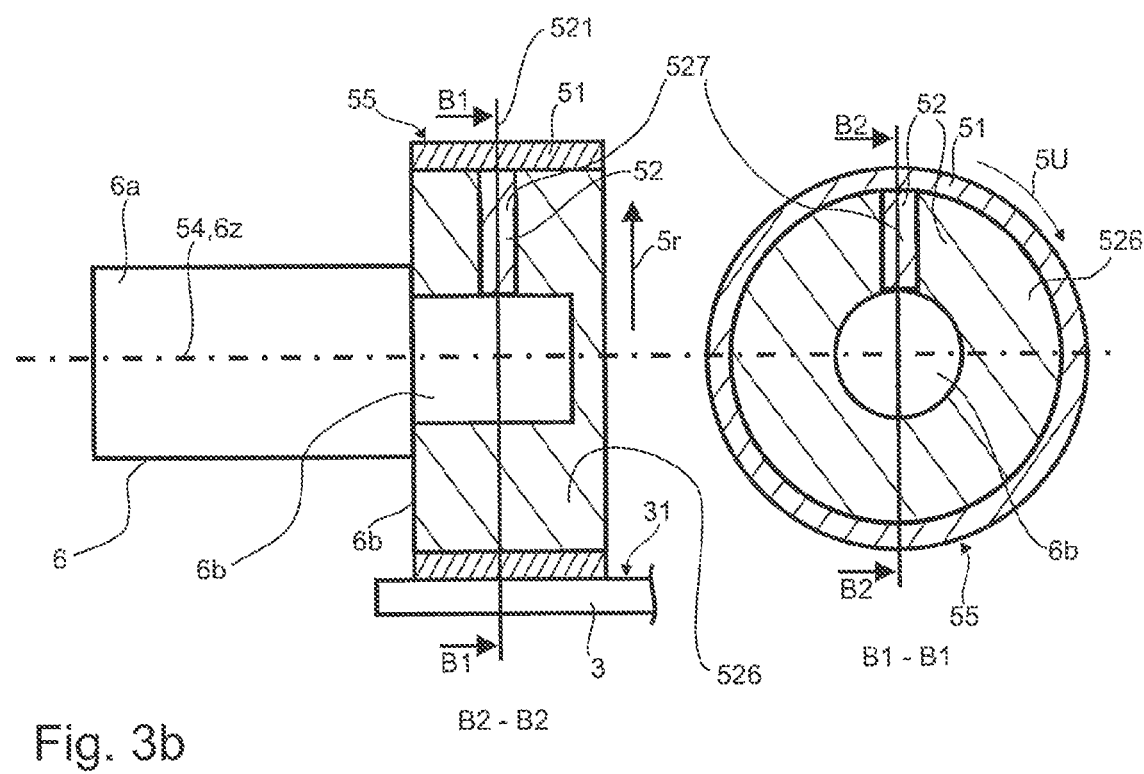
FIG. 3b is a second preferred embodiment of the used running roller.

The FIG. 3b shows an embodiment, according to which the second area 52 is arranged throughout in circumferential direction 5U and in axial direction 54 of the running roller 5. The second area 52 comprises two sections 526 and 527, of which the second section 527 is designed in the shape of a metal pin which is connected to the axle member 6. In this case, a bottom end of the metal pin has a not shown outer thread, which forms a screw connection with a not shown internally threaded hole of the axle member 6. A middle axle 521 of the metal pin is parallel to the radial direction 5r of the running roller 5. This metal pin is arranged as the second section 527 of the second area 52, while a first section 526 of the second area 52 is arranged surrounding the metal pin, in such a manner that the second area 52 is formed overall in the shape of a sleeve.

Figure 3C:
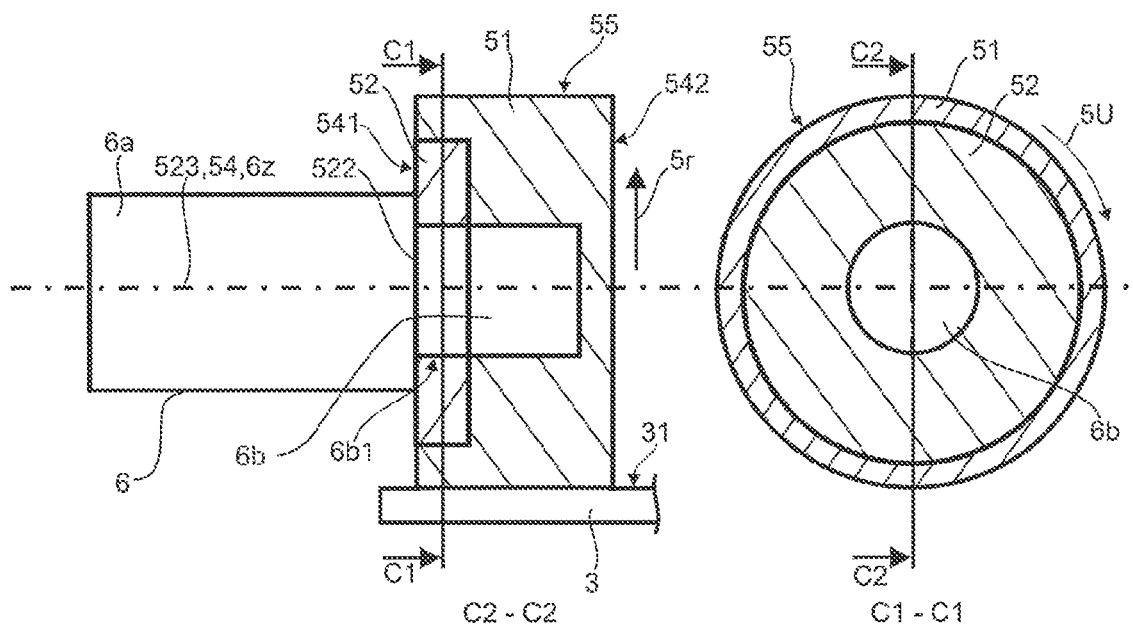
FIG. 3c is a third preferred embodiment of the used running roller.

The FIG. 3c shows an embodiment, according to which the second area 52 is not arranged throughout in axial direction 54 of the running roller 5. In the present case, the second area 52 is designed in the shape of a washer, wherein an inner diameter 522 of a through-hole of this washer is arranged in contact with an outer diameter 6b1 of the axle member 6. In the present case, a middle axle 523 of the washer is aligned with the middle axle 6z of the axle member 6. The running roller 5 has a first end 541 and a second end 542 in relation to its axial direction 54. The second area 52 forms here at least partially the first end 541 of the running roller 5. The remainder of the running roller 5 is designated through the first area 51, which is arranged contacting the second area 52 in axial direction 54 and in radial direction 5r of the running roller 5.

If, for example, according to FIG. 3b the running roller 5 is in the first state of wear, the section of the first area 51, which in the default state is arranged in the radial direction 5r of the running roller 5 between the second area 52 and the running surface 55, is abraded and no longer present. Then, in the course of one rotation of the running roller 5, the second section 527 of the second area 52 also forms contact with the guide rail 3, at least for a limited time.

Figure 3D:
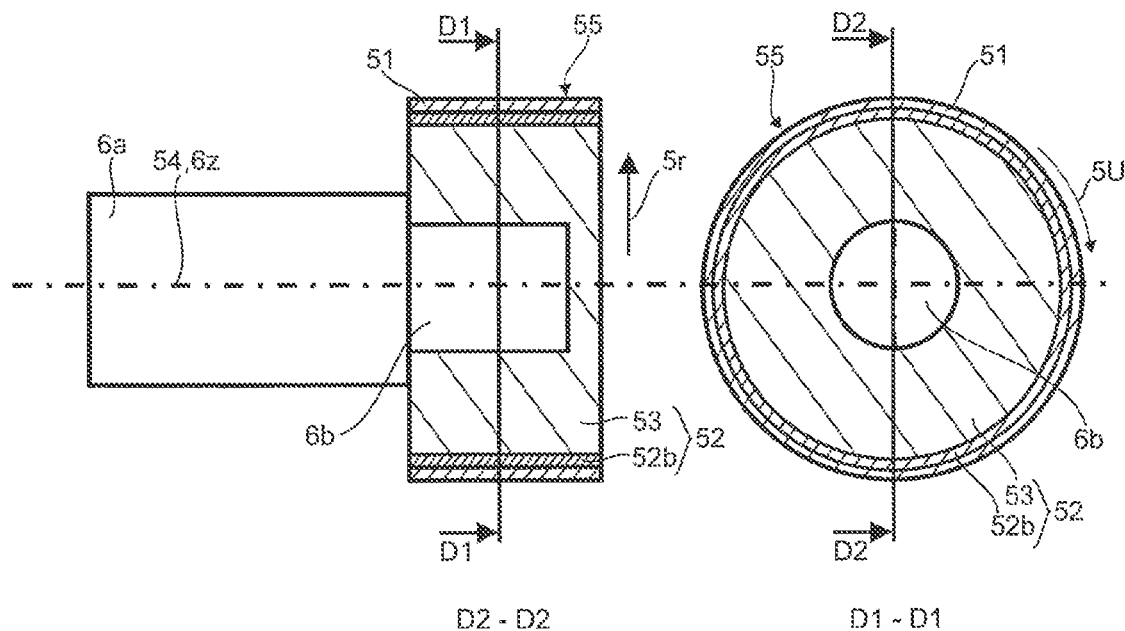
FIG. 3d is a third preferred embodiment of the used running roller.

According to FIG. 3d, an embodiment is also shown according to which the second area 52 of the running roller 5 comprises a third area 53 which is arranged in the radial direction 5r of the running roller 5 between the axle member 6 and a remainder 52b of the second area 52 and in contact with both, wherein an electrical conductivity of the remainder 52b of the second area 52 is lower than an electrical conductivity of the third area 53. In the present case, the third area 53, the remainder 52b of the second area 52 and the second area 52 are each formed in the shape of a sleeve. According to FIG. 3d, the first area 51 is also completely contactless to the axle member 6, 6a, 6b and is only arranged in the shape of a coating with a layer thickness of 0.5 mm on the remainder 52b of the second area 52.

In the embodiment, according to FIG. 3c, the material of the first area 51 is by injection moulding shaped to the material of the second area 52.

In the embodiment, according to FIG. 3b, the material of the first section 526 of the second area 52 is a plastic material, whereas the second section 527 (metal pin) is inserted into the shape as an insertion part before the injection moulding process and is overmoulded by the second area 52. The metal pin serves here for increasing the electrical conductivity of the second area 52.

Figure 2:
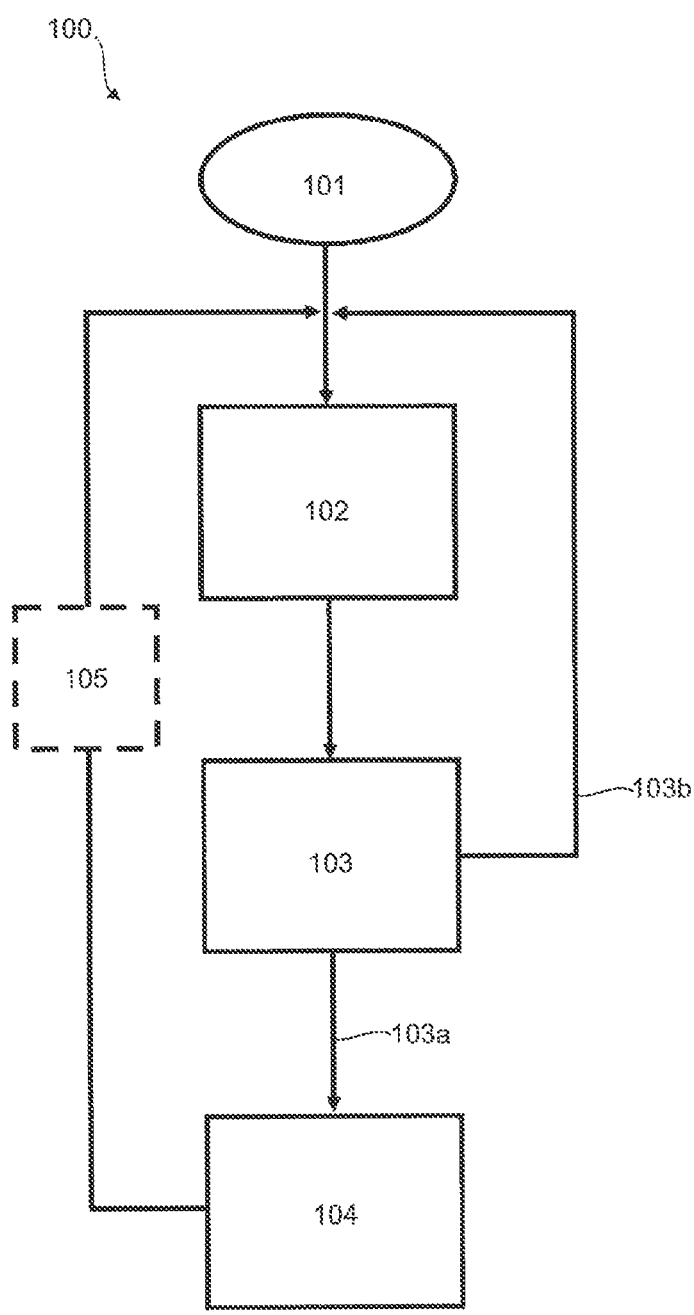
FIG. 2 is a flow chart for an underlying method.

The FIG. 2 now shows the course of a method 100 for measuring the resistance of a vehicle seat 1 according to the invention. After the start 101 of the method, the resistance R is measured by the measuring apparatus 7 according to step 102. In a step 103 it is verified whether the measured actual resistance is smaller than the first total resistance and/or equal to the second total resistance, which is to be affirmed according to arrow 103*a* and negated according to arrow 103*b*. According to arrow 103*a*, a message is sent to a superior control unit according to step 104, which recommends the replacement of the running roller 5. This replacement can optionally be carried out according to step 105. Afterwards the method returns to step 102. According to arrow 103*b*, the method returns to step 102 without a message.

All the features disclosed in the application documents are claimed as being essential to the invention, provided that they are, individually or in combination, novel compared to the prior art.

LIST OF REFERENCE SIGNS

1 vehicle seat
2 roller guide
3 guide rail
5 running roller
5*r* radial direction
5U circumferential direction
6, 6*a*, 6*b* axle member
6*a*, 6*b* portion of the axle member
6*b*1 outer diameter
6*z*, 54, 521, 523, 525 middle axle
7 scissor frame
31 roller-underside inner wall
51, 52 area
55 running surface
522,524 inner diameter
526 section
527 Section, metal pin
541, 542 end
AL armrest
OT top part
R resistance
RL backrest
ST seat part
UT bottom part

What is claimed is:

1. A vehicle seat, comprising:
a roller guide, wherein the roller guide has at least a guide rail that is at least partially sideways open, and at least one running roller that rolls in the guide rail and is connected to parts of the vehicle seat via an axle member,
wherein a running surface of the running roller is rollable along a roller-underside inner wall of the guide rail which is arranged parallel to or at an angle to a middle axle of the running roller,
wherein the running roller comprises at least a first area and a second area,
wherein the first area forms at least a part of the running surface and the second area is arranged in a radial direction of the running roller at least partially between the axle member and the first area and in contact with both,
wherein an electrical conductivity of the first area is lower than an electrical conductivity of the second area, and
wherein a measuring apparatus is provided for measuring an electrical resistance between the axle member and the guide rail in the radial direction.

2. The vehicle seat according to claim 1, wherein the second area is designed in one or more of the shape of a sleeve, a pin, or a plate.

3. The vehicle seat according to claim 2, wherein the first area is arranged without contact to the axle member.

4. The vehicle seat according to claim 2, wherein the first area completely forms the running surface.

5. The vehicle seat according to claim 2, wherein the first area is made of a first plastic and the second area is made of a second plastic or a metallic material.

6. The vehicle seat according to claim 2, wherein the second area of the running roller comprises a third area, which is arranged in the radial direction of the running roller at least partially between the axle member and a remainder of the second area and in contact with both, and
wherein an electrical conductivity of the remainder of the second area is lower than an electrical conductivity of the third area.

7. The vehicle seat according to claim 1, wherein the first area is arranged without contact to the axle member.

8. The vehicle seat according to claim 7, wherein the first area completely forms the running surface.

9. The vehicle seat according to claim 7, wherein the first area is made of a first plastic and the second area is made of a second plastic or a metallic material.

10. The vehicle seat according to claim 7, wherein the second area of the running roller comprises a third area, which is arranged in the radial direction of the running roller at least partially between the axle member and a remainder of the second area and in contact with both, and
wherein an electrical conductivity of the remainder of the second area is lower than an electrical conductivity of the third area.

11. The vehicle seat according to claim 1, wherein the first area completely forms the running surface.

12. The vehicle seat according to claim 11, wherein the first area is made of a first plastic and the second area is made of a second plastic or a metallic material.

13. The vehicle seat according to claim 1, wherein the first area is made of a first plastic and the second area is made of a second plastic, a metallic material, or a second plastic and a metallic material.

14. The vehicle seat according to claim 1, wherein the second area of the running roller comprises a third area, which is arranged in the radial direction of the running roller at least partially between the axle member and a remainder of the second area and in contact with both, and
wherein an electrical conductivity of the remainder of the second area is lower than an electrical conductivity of the third area.

15. The vehicle seat according to claim 1, wherein the first area is made of a first plastic and the second area is made of a second plastic or a metallic material.

* * * * *